(12) United States Patent
Walter

(10) Patent No.: US 6,453,450 B1
(45) Date of Patent: Sep. 17, 2002

(54) TIMING DIAGRAM COMPILER AND RUNTIME ENVIRONMENT FOR INTERACTIVE GENERATION OF EXECUTABLE TEST PROGRAMS FOR LOGIC VERIFICATION

(75) Inventor: Joerg H. Walter, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/496,547

(22) Filed: Feb. 2, 2000

(51) Int. Cl.⁷ .............................................. G06F 17/50
(52) U.S. Cl. ......................................................... 716/6
(58) Field of Search ........................... 700/83; 716/1–21

(56) References Cited

U.S. PATENT DOCUMENTS

| | | | |
|---|---|---|---|
| 4,744,084 A | 5/1988 | Beck et al. ................. 371/23 |
| 5,111,413 A | 5/1992 | Lazansky et al. .......... 364/578 |
| 5,600,567 A | 2/1997 | Kucukcakar et al. ....... 364/488 |
| 5,633,998 A | 5/1997 | Schlafly ..................... 395/180 |
| 5,726,918 A | 3/1998 | Giramma et al. ........... 364/578 |
| 5,745,386 A | 4/1998 | Wile et al. .................. 364/578 |
| 5,790,435 A | 8/1998 | Lewis et al. ................ 364/578 |
| 5,798,938 A | 8/1998 | Heikes et al. .............. 364/490 |
| 5,850,348 A | 12/1998 | Berman ..................... 364/488 |
| 5,857,093 A | 1/1999 | Bradford ................... 395/500 |
| 5,867,399 A | * 2/1999 | Rostoker et al. ............ 716/18 |
| 5,933,356 A | 8/1999 | Rostoker et al. ........... 364/489 |
| 6,268,853 B1 | * 7/2001 | Hoskins et al. ............. 700/83 |

FOREIGN PATENT DOCUMENTS

JP          10-074214          3/1978

* cited by examiner

Primary Examiner—Matthew Smith
Assistant Examiner—Thuan Do
(74) Attorney, Agent, or Firm—Lynn L. Augspurger

(57) ABSTRACT

A designer's timing diagram editor tool set provides programs for logic verification at logic design level. External stimulus to the design is done by a set of irritator programs created by the designer and derived from timing diagrams describing the input signals to be driven and/or the output signals to be checked of the logic under test. A timing diagram editor provides a graphical user interface that allows the logic designer to describe his or her logic in a general timing diagram format. Timing diagrams are then compiled into stand-alone executable programs. Sets of one or more executable timing diagrams (called buckets) can be defined. A simulation driver reads in the bucket file specified and randomly selects timing diagrams to stimulate the design under test with legal scenarios described in the timing diagrams.

14 Claims, 10 Drawing Sheets

```
1      class _MCR41
2          {
3          public:
4          _MCR41();
5          virtual ~_MCR41();
6          int sequence(char *request);
7          private:
8          int state_cycle_count;
9          int loaded;
10
11         unsigned long PHold[4];
12         unsigned long GHold[2];
13
14         int numcycles;
15         int td_cycle;
16         };
```

Figure 4

```
1      facdef FAC[6] = {
2          {'x', "CBUS_DATA",        NULL, 0, 31, 0},
3          {'x', "CBUS_DATA",        NULL, 32, 63, 0},
4          {'x', "CBUS_WR_ADDR",     NULL, 0, 6, 0},
5          {'x', "CBUS_WR_FLAGS_0",  NULL, 0, 0, 0},
6          {'x', "MCR41",            NULL, 0, 31, 0},
7          {'x', "MCR41",            NULL, 32, 63, 0}
8          };
```

Figure 5

```
1   // Wrapper function (called by the randomizer)
2   int MCR41(char *request, int **objptr)
3   {
4       char accMode;          /* --- possible values: { N, P, G, K} - */
5       static int loaded=0;
6
7       accMode = request[ACC_MODE];
8
9       if (!loaded)
10          {
11          loaded++;
12          init_facs();
13          }
14      if (accMode == 'N')
15          {
16          if (limitor() == TRUE)
17              {
18              *objptr = (int *)new _MCR41();
19              return TRUE;
20              }
21          else
22              {
23              *objptr = NULL;
24              return FALSE;
25              }
26          }
27      else if ((accMode == 'P') || (accMode == 'G'))
28          {
29          /* Call sequence object */
30          return ((_MCR41 *)objptr)->sequence(request);
31          }
32      else if (accMode == 'K')
33          {
34          delete *objptr;
35          return TRUE;
36          }
37  }
```

Figure 6

```
1    int _MCR41::sequence(char *request)
2        {
3        char accMode;
4        accMode = request[ACC_MODE];
5
6        switch (td_cycle)
7            {
8            case 0:
9                if (accMode == 'P')
10                   {
11                   PHold[0] = 0x1234567;
12                   sfl_seti(&FAC[0], 0, 31, PHold[0]);
13                   ...
14                   }
15               else
16                   {
17                   GHold[0] = 0x0;
18                   sfl_geti(&FAC[4], 0, 31, GHold[0], "MCR41", 0);
19                   ...
20                   td_cycle++;
21                   }
22               break;
23           ...
24           }
25       if (td_cycle == numcycles)
26           return TRUE;
27       else
28           return FALSE;
29       }
```

Figure 7

```
1      case 2:
2          if (!loaded)
3              {
4                  loaded++;
5                  timeout[0] = sfl_brnd(0x3, 0x5);
6              }
7          if (state_cycle_count < timeout[0])
8              {
9                  if (accMode == 'P')
10                     {
11                         PHold[0] = 0x0;
12                         sfl_seti(&FAC[0], 0, 31, PHold[0]);
13                         ...
14                     }
15                 else
16                     {
17                         GHold[0] = 0x0;
18                         sfl_geti(&FAC[4], 0, 31, GHold[0], "MCR41", 2);
19                         ...
20                         state_cycle_count++;   // increment timeout counter
21                     }
22                 break;
23             }
24         else
25             {
26                 td_cycle++;
27                 state_cycle_count=0;   // reset timeout counter
28                 loaded = 0;
29             }
```

```
1    // This is the startup condition, must return TRUE to activate testcase
2    int limitor(void)
3    {
4            return TRUE;
5    }
6
7
8
9    // Lookup pointers to facilities (signal names or program variables)
10   void init_facs(void)
11   {
12           int i, k;
13
14           for (i=0; i<6; i++)
15                   {
16                   for (k=0; k<i; k++)
17                           {
18                           if (!strcmp(FAC[i].name, FAC[k].name))
19                                   {
20                                   FAC[i].facptr = FAC[k].facptr;
21                                   FAC[i].pv    = FAC[k].pv;
22                                   break;
23                                   }
24                           }
25                   if (FAC[i].facptr == NULL)
26                           sfl_init(&FAC[i]);
27                   }
28   }
```

Figure 10

```
/* Sequence    Counter  Max_Active  Probability  Clockarea  Noquiesce */
1  c0req       c0q      1           100          fast
2  c1req       c0q      1           100          fast
3  c01rq.pty                                     fast
4  c2req       c2q      1           100          slow
5  c3req       c2q      1           100          slow
6  c23req.pty                                    slow
7  c01rsp      c0s      1           100          fast       noq
8  c22rsp      c2s      1           100          slow       noq
9  reset
10 endcheck
```

```
Testcase cfg completed successful after 1000044 sim cycles on
Wed Dec 17 13:35:36 1997

Statistics

Seed: 0x3497A56E
No.|Name   |prob.|#times run|#lmtr kills|last run|Runtime (Sim cycles)
   |       |     |          |           |        | min.| avg.| max.
---|-------|-----|----------|-----------|--------|-----|-----|------
  1|c0req  | 100 |    9817  |        0  | 999980 |  20 |  97 |  328
  2|c1req  | 100 |    9817  |        0  | 999988 |  20 |  97 |  312
  3|c2req  | 100 |    9787  |        0  | 999956 |  20 |  98 |  324
  4|c3req  | 100 |    9828  |        0  | 999976 |  20 |  97 |  364
  5|c01rsp | 100 |    9169  |        0  | 999992 |  32 | 105 |  324
  7|c23rsp | 100 |    9168  |        0  | 999980 |  28 | 105 |  320

Simulation run included Reset testcase
Simulation run included Endcheck testcase
```

TIMING DIAGRAM COMPILER AND RUNTIME ENVIRONMENT FOR INTERACTIVE GENERATION OF EXECUTABLE TEST PROGRAMS FOR LOGIC VERIFICATION

FIELD OF THE INVENTION

This invention relates to an improved method for constructing irritator programs from a graphical description useful to verify logic at the logic design level and also, more particularly, to facilitate the construction of stimulation and checker programs to exercise the logic to be tested.

Trademarks: S/390 and IBM are registered trademarks of International Business Machines Corporation, Armonk, N.Y., U.S.A. Other names may be registered trademarks or product names of International Business Machines Corporation or other companies.

BACKGROUND

The task of verification of a logic design is usually done by examining small pieces of logic (called units) first. Then these pieces are grouped together to form bigger blocks, up to the point where a simulation model contains the whole system. In this way, large systems are debugged and verified bottom-up in a hierarchical manner.

Below system level, state of the art verification methods replace missing hardware components by software, so-called irritator behaviorals (i.e. random simulation driver inputs). They are attached to the interfaces of the logic under test.

This approach to logic design verification are deficient in at least two respects. If the task of verification is the responsibility of the logic designer, the programming language which is used (usually C/C++) is often unfamiliar to him or her.

In any case, programming an irritator program is tedious and error-prone. Given ever increasing design complexity and therefore number of units, increasing numbers of irritators are required. In current designs, a substantial amount of time is necessary to write and debug the irritator programs.

A big improvement has been the introduction of the Timediag/Genrand tools (IBM's Bruce Wile's U.S. Pat. No. 5,745,386, entitled "Timing Diagram Method For Inputting Logic Design Parameters To Build A Testcase For The Logic Diagram"), which allowed the use of timing diagrams as irritator programs for S/390 designer level efforts for a few designs. Using Timediag, timing diagrams could be constructed easily using a graphical interface. While the improvement was great, the tools created in accordance with this patent were as described for support of designer level simulation, and this was achieved for the lowest level of verification using small designs only (e.g restriction in the number of timing diagrams).

SUMMARY OF THE INVENTION

This current invention provides a method for verifying logic designs which uses the concepts of irritator behaviorals but with a timing diagram input format, which can be used intuitively by logic designers without knowledge about the underlying programming language. The preferred embodiment enables the designer user to lay out and/or edit a timing diagram using a Timing Diagram Editor with a TD-compile (Timing Diagram compile which now generates in accordance with this invention an executable timing diagram for the graphical input provided by the user). Instead of manually programming a behavioral description of a logic circuit, the behavior of signals at any given time is specified in a spreadsheet like editor. These spreadsheets then are compiled into an executable irritator program for logic verification. Providing a graphical user interface to specify logic behavior makes testcase generation much easier and more intuitive. This results in significant savings of time.

In accordance with this invention a method is provided to translate a behavioral description of a logic design or an interface protocol, available in timing diagram format, into a C++ class. The C++ file generated then is compiled into a stand-alone executable file or a shared library, whatever the preferences of the user are. Shell scripts are used to control compilation of the C++ file, so the user can modify the way an executable is generated (e.g. with compile optimization, and with debug support and with other user desired modification of generation of compiles).

In accordance with the invention a random driver program is used to read a configuration file containing a list of timing diagrams and other parameters to generate therefrom a random simulation driver.

The invention provides support for multiple clock domains, where different parts of a design under test run at different clock speeds.

These and other improvements are set forth in the following detailed description. For a better understanding of the invention with advantages and features, refer to the detailed description and to the drawings.

DRAWINGS

FIG. 4 shows the class definition of the timing diagram of FIG. 3.

As shown in FIG. 5, the include file for the class definition contains an array of all the signal names used in a timing diagram.

FIG. 6 shows the entry function of an executable timing diagram.

FIG. 7 shows the sequence function of the example timing diagram.

Figure 3:
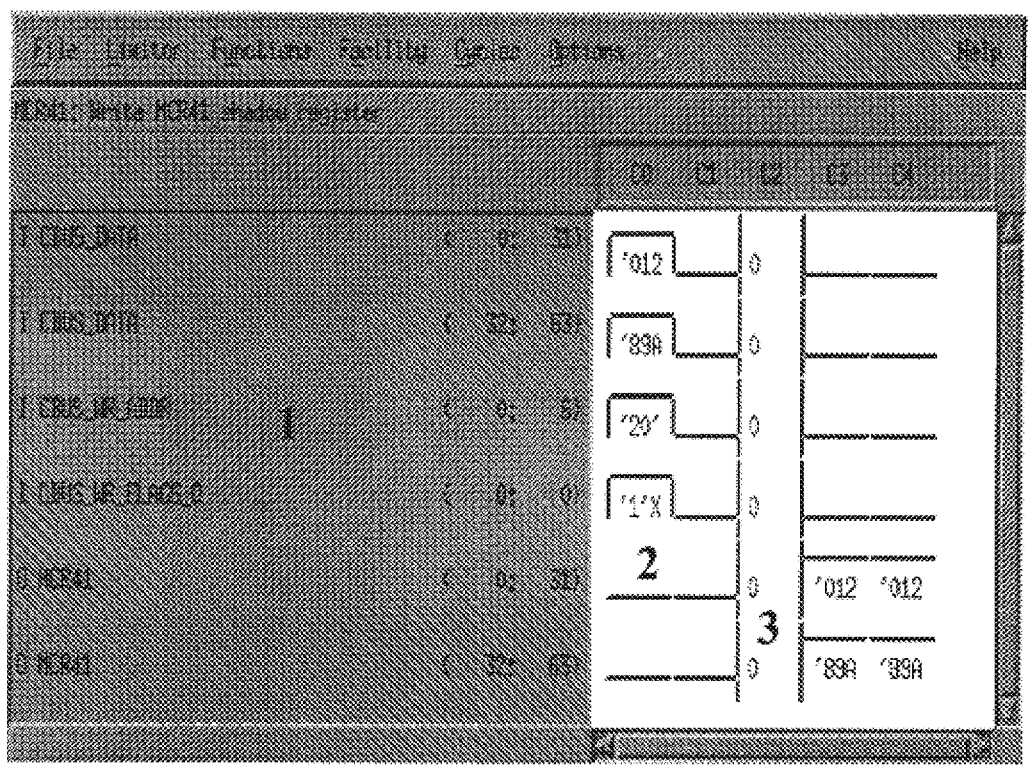
FIG. 3 illustrates the graphical interface which provides a spreadsheet.
Figures 8, 9:
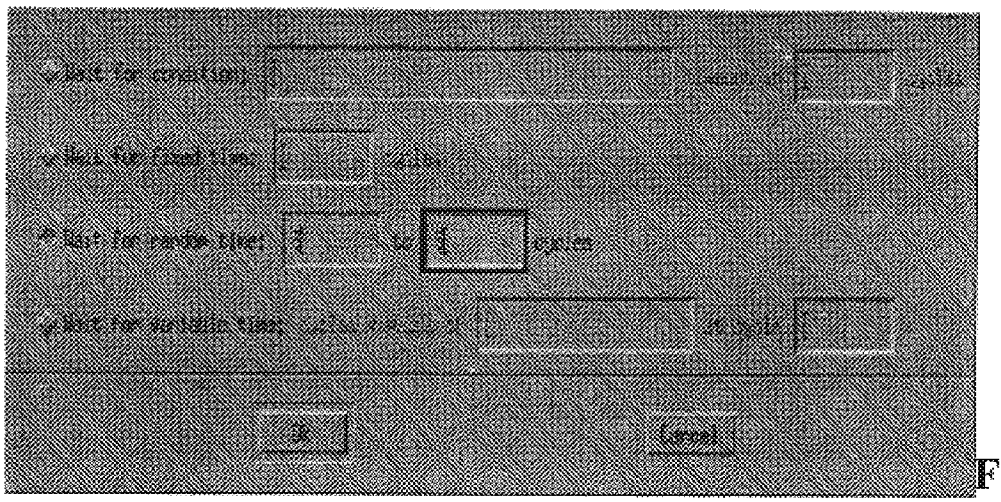

FIG. 8 illustrates the case for the special (recurring) cycle C2 condition of the timing diagram shown in FIG. 3, while FIG. 9 shows the code translation of this special recurring cycle.

FIG. 10 it shows the limitor function and the facility initialization function.

Figures 11, 12:
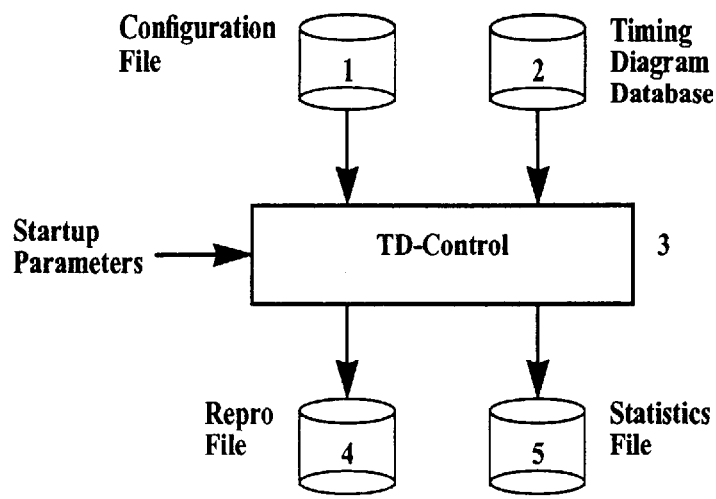

FIG. 11 shows the simulation driver TD-control.

FIG. 12 shows the contents of a configuration file, and

FIG. 13 shows a statistics file generated by TD-Control about a simulation run.

DETAILED DESCRIPTION OF THE INVENTION

Before considering our preferred embodiments in detail, it may be worthwhile, by way of example, to note, briefly, that this invention contemplates the provision of a tool set to provide logic verification at subsystem level. External stimulus to the design is derived from a series of generalized timing diagrams describing the behavior of interfaces or operations.

A timing diagram editor provides a graphical user interface that allows the user to describe his or her logic in a general timing diagram format incorporating permutations of the behavior described. The output of the timing diagram editor is a set of executable programs, where each timing diagram is translated into one file. A suitable simulation driver reads a configuration file containing a list of names of the timing diagram executables and uses randomization algorithms to drive the simulation model according to the behavior specified in the timing diagrams. For each timing diagram, a limitor function can be specified. This limitor function contains conditions that must be true for a timing diagram sequence to be initiated. As a timing diagram is translated into a C++ class, multiple instances of a timing diagram can be initiated by simply creating additional objects of that class.

Timing diagrams are used in two basic ways: a first way is to describe an interface in part or in whole, so that a timing diagram or a set of timing diagrams can replace a piece of hardware usually attached to this interface (interface oriented approach). A second way is to describe an operation in the system, from it's beginning to it's end, possibly covering multiple interfaces (operation oriented approach).

THE PREFERRED EMBODIMENT

Figure 1:
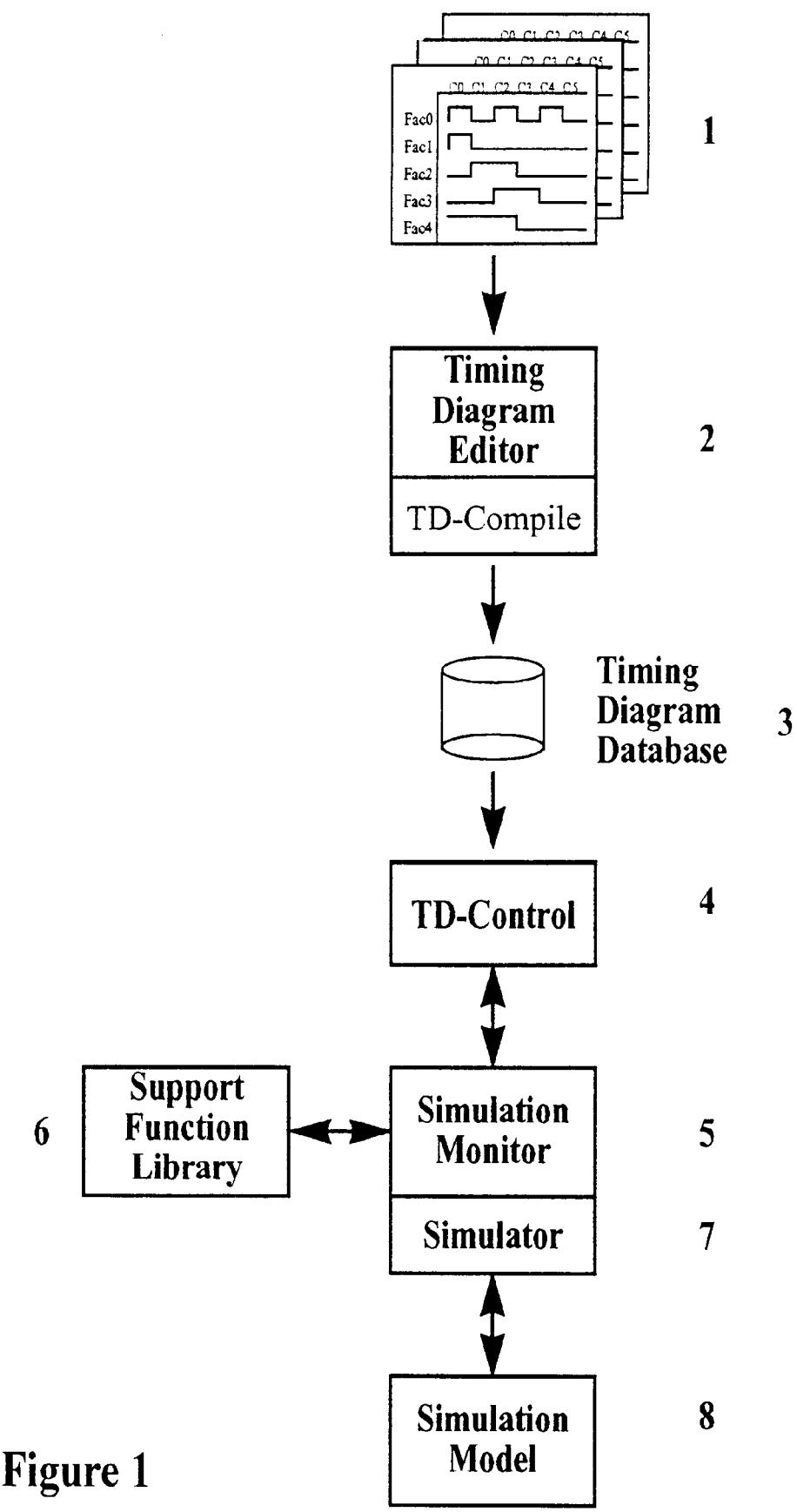
FIG. 1 shows the preferred embodiment in which the user lays out and/or edits a timing diagram using a Timing Diagram Editor with a TD-compile.
Figure 2:
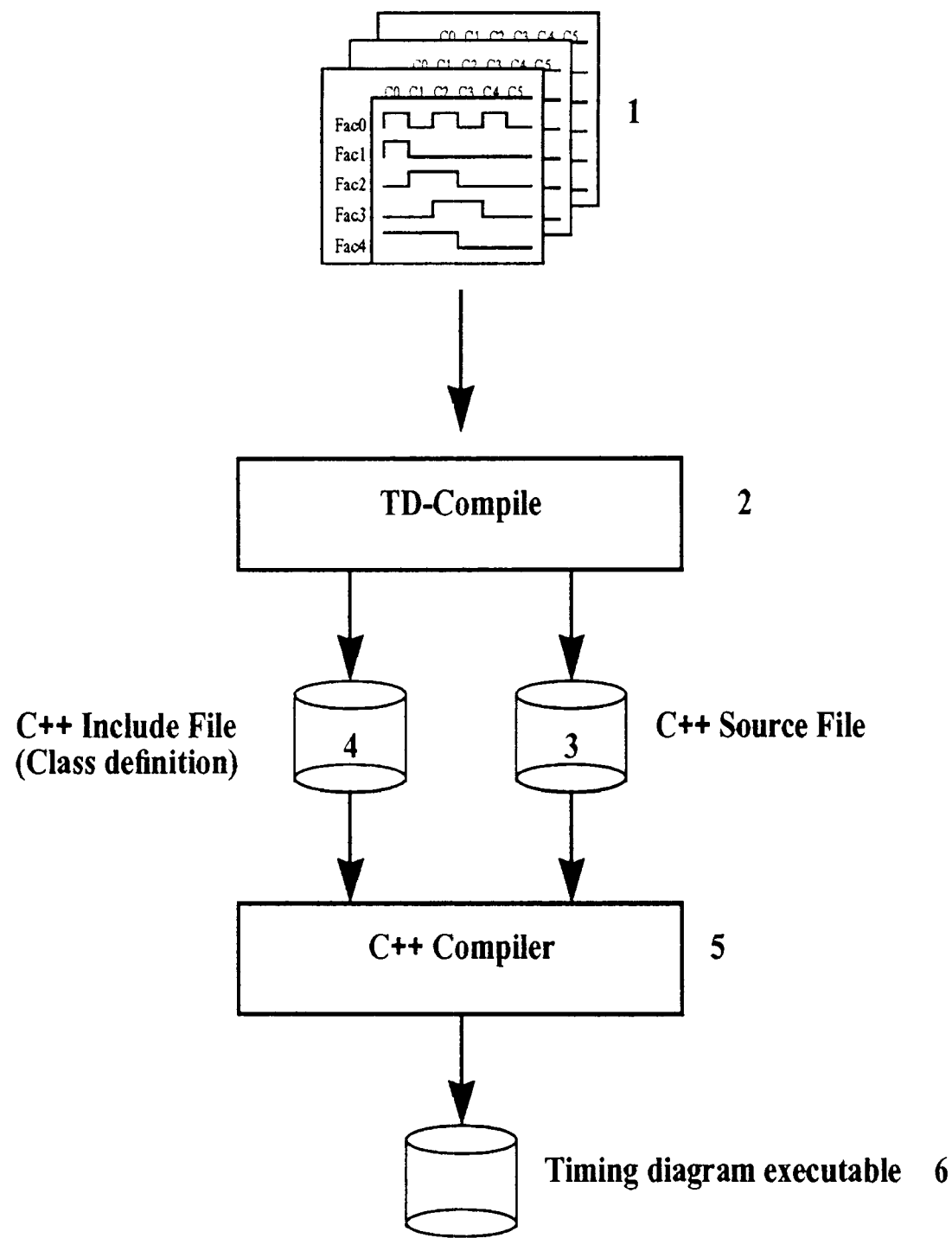
FIG. 2 shows how the graphical representation of a timing diagram 1 is processed.

Turning now to our invention in greater detail, it will be seen from FIG. 1 which illustrates the preferred embodiment in which the user lays out and/or edits a timing diagram 1 using a Timing Diagram Editor 2. In accordance with this invention there has been a TD-compile, which is a new part of the timing diagram editor which now generates an executable timing diagram for the graphical input provided by the user. The set of executable timing diagrams makes up the Timing Diagram Database 3. TD-Control 4, a random simulation driver, randomly picks up timing diagrams from the database to drive the simulation model 8 via a simulation monitor 5 and a simulator 7. The simulation monitor controls simulation and provides services like traces to the use. In addition, it forms a layer of abstraction between the simulation driver and the simulator. Therefore, different simulators can be used without need to change the code of TD-Control. In contrast to U.S. Pat. No. 5,745,386, executable timing diagrams are stored in separate files. Therefore, they need a means to communicate, e.g. when one timing diagram looks for a condition set by another. A Support Function Library 6 provides these and other services, for example all of the built-in functions, to the timing diagram executables. Referring now to FIG. 2, it shows how the graphical representation of a timing diagram 1 is processed: The timing diagram compiler TD_compile 2 reads the input and generates a C++ source Figure file 3 as well as an include file 4. A standard C++-compiler 5 is then used to generate an executable timing diagram file 6. By default, the generated source files are deleted after compilation. A Timediag option alternatively allows to just create the C++ code, which could then be modified by the user. In this way, the timing diagram editor can be used to create a frame to simplify development of behavior programs.

As illustrated in FIG. 3, the graphical interface provides a spreadsheet, where rows represent signals and columns represent cycles. Signals 1 are specified as either inputs or outputs, indicated by an 'I' or 'O' before the signal name. Bi-directional signals are specified as both inputs and outputs. Signals can be modified in full or in part, depending on the bit range specified after the signal name.

A cell 2 (the intersection of row x and column y) contains the value for signal x at the time y or an 'X', if the cell is don't care. Values in a cell can be specified directly, derived from another cell or evaluated by a function. Besides the built-in functions, the user can include user-defined programs to extend the functionality of the tool.

A column can be declared to be a special cycle (a so-called recurring cycle) 3, lasting until either a random or fixed number of cycles elapsed, or until a given condition is met (e.g. to wait for a handshake signal). If a condition is given, a time-out value specifies how long to wait before an error is flagged. A limitor condition is used to specify when a timing diagram can be activated, how many instances of a timing diagram can be active and a default probability the timing diagram is selected with.

Referring now to FIG. 4, the class definition of the timing diagram of FIG. 3 is shown. This class definition is part of the include file generated by TD-Compile. Besides the constructor and the destructor (lines 4 and 5), there is only the 'sequence', function accessible from outside the class (line 6). The sequence function contains the description of a timing diagram. It is used to step through a timing diagram during execution. Private members of a timing diagram class are arrays to hold values to be driven or checked (lines 11 and 12). In this case, there are 4 signals to set and 2 signals to check per cycle. Several counters are included also in the timing diagram class: td_cycle (line 15) represents the cycle the timing diagram is in (C0 . . . Cn). state_cycle_count (line 9) counts how long a timing diagram remains in a timing diagram cycle. It is used to check for ending and/or time-out conditions in recurring cycles. The number of cycles a timing diagram comprises is stored in numcycles (line 14).

In addition to the class definition, the include file contains an array of all the signal names used in a timing diagram. It is shown in FIG. 5. Each entry defines a signal type, which is set to 'x' for don't care in this case. After the signal name, storage for a pointer to the signal is provided, initialized to a NULL pointer. The real values are determined at runtime. After the bit range, a flag indicates whether a signal is a facility in the simulation model, or a program variable just used for communication between timing diagrams. If during runtime a signal is not found in the simulation model, it is converted automatically to a program variable. A warning message is printed to tell the user about the conversion.

Referring now to FIG. 6 it shows the entry function of an executable timing diagram (line 2). It has the same name as the timing diagram and takes two arguments: A request describing what the entry function should do, and a pointer to the object the operation should be performed on. When called for the first time, the entry function initiates a search for the signal names used by the timing diagram (lines 9–13). This has to be done only once per simulation run. The entry function accepts four requests. When called with 'N' (New, line 14), the limitor function of the timing diagram is called (line 16) to evaluate, if the conditions to activate the timing diagram are met. If the limitor function evaluates to true, a new instance of the timing diagram class is generated, the object pointer is set to that newly created object and the entry function returns true to the calling program (lines 18 and 19). Otherwise, the object pointer is set to a NULL pointer and the entry function returns false (lines 23 and 24).

After initialization, the entry function is called twice per cycle (line 27), once at the beginning with a request of 'P'

(Put) and once at the end with a request of 'G' (Get). During the put state, all input signals specified in a timing diagram are set. Then, the logic of the simulation model is evaluated and at the get cycle, all output signal specified in a timing diagram are read and compared to their expected values. These requests are simply passed on to the sequence function (line 30).

The return value is sent back to the calling program (TD-Control).

After a timing diagram has been executed successfully, the entry function is called with a 'K' (Kill) request (line 32) and the corresponding object is destroyed (line 34).

FIG. 7 shows the sequence function of the example timing diagram. The cycles of a timing diagram are translated into a C++ switch construct (line 6), where each timing diagram cycle is represented as a case statement (line 8). In put state, the values specified in the timing diagram are set to the signals (lines 11 and 12). A function of the support function library SFL is used to set signals, to keep the code of a timing diagram small. The actual setting of model signals and program variables is done inside the SFL. In the same way, signals are checked in the get state (lines 16–21). In addition to the pointer to the signal and the bit range, the sfl_geti function (line 18) takes the expected value and the name of the timing diagram as arguments, so the checking can be done inside the SFL. Therefore the checking code doesn't have to be replicated multiple times in all the timing diagram executables.

The special (recurring) cycle C2 condition of the timing diagram shown in FIG. 3 is depicted in FIG. 8. In this case, the timing diagram waits for 3 to 5 simulation cycles when in timing diagram cycle C2 (other choices would be to wait for a condition to become true, to wait for a fixed time, or to wait for a number of cycles specified by the contents of another timing diagram cell). The code translation of this recurring cycle is shown in FIG. 9. When entering cycle C2, a time-out value is loaded by calling a function of the support function library (lines 2–6). It returns a random value between the lower and the upper limit specified in the recurring cycle condition dialogue (line 5). For the number of simulation cycles determined this way, the timing diagram signals are driven and checked according to the values specified for C2 (lines 9–21). In addition, the state cycle counter is incremented (line 20). When the time-out value is reached, the timing diagram cycle is incremented and the recurring conditions are reset (lines 25–29).

Referring to FIG. 10 it shows the limitor function and the facility initialization function. The limitor function is unconditional, it just returns true (line 4). Therefore this timing diagram can be activated whenever it is selected by TD-Control.

To get a pointer to a signal name specified in a timing diagram, a function of the SFL is called (line 26). Signal names not found in the simulation model are treated as program variables and are handled by the SFL, because program variables must be visible to all active timing diagrams. Before calling the lookup function in line 26, the function checks whether the pointer is already available. The same signal may appear more than one time, for example with different bit ranges. In this case, the pointer and the program variable flag are just copied from the one already available (lines 18–23).

Referring now to FIG. 11, the simulation driver TD-control 3 is shown. TD-control uses a configuration file (config file) 1 to select executable timing diagrams from the database 2 and drives simulation by executing the selected timing diagrams. In case an error occurs, the user must be able to reproduce a simulation run. For this purpose, a repro file 4 is written. If a simulation run is successful, a statistics file 5 can be written if selected by the user.

On startup, TD-Control reads a set of parameters, provided by the simulation monitor, to determine how a simulation run should be set up. The name of the config file must be specified using the "RND_ConfigFile <config file name>" statement. All other parameters are optional. By default, TD-control activates timing diagrams after a reset interval (per default 5 cycles, can be modified using the "RND_ResetCycles <decimal value>" statement) until simulation is stopped by the user. In this mode, timing diagrams might not be complete when simulation is stopped, so an error might be flagged. To avoid errors due to still running timing diagrams, a quiesce cycle can be specified using the "RND_QuiesceCycle <decimal value>" statement. When this cycle is reached, no more timing diagrams are activated (unless they don't have the "noquiesce" attribute, see below). The "RND_EndAfterQuiesce [YES|NO]" statement determines what happens when all timing diagrams are finished after reaching the quiesce cycle. If set to YES, simulation is stopped after the last active timing diagram is finished, no matter how many cycles the simulation was supposed to run (to avoid clocking the model without stimulus) and control is returned to the user. Finally, using the "RND_Messages <hex value>" determines the level of information given by TD-Control. Each bit in <hex value> enables specific messages.

The contents of a configuration file is shown in FIG. 12. It basically is a text list of timing diagrams available for simulation. Each line contains a timing diagram name and a specification, how it should be activated. After the name, a counter is specified. The Max_Active value determines, how many instances of a timing diagram can be active per counter. For example, timing diagrams c0req and c1req in the table above both use the same counter c0q with a Max_Active value of 1, so only one instance of either c0req or c1req can be active. The probability determines the startup probability of a timing diagram. Clockarea specifies the clock domain in which the timing diagram should run. This is required because some designs have interfaces running at different speeds (e.g. fast processor interface and slow memory interface). TD-control keeps a list of active timing diagrams for each clock domain, so timing diagrams are called only when the corresponding clock domain is active. Timing diagrams can be activated even if simulation is quiesced, if they have a noquiesce marker in their config file entry. Generally, timing diagrams responding to other timing diagrams should use this to avoid errors due to incomplete sequences. Clockarea and noquiesce are optional, if omitted, the timing diagram will be called every cycle and quiesced after the quiesce cycle is reached.

Three types of special entries are given in the config file. The reset timing diagram is run only once, before activation of other timing diagrams starts. After execution of timing diagrams ended, the endcheck timing diagram is called once before simulation stops. If a timing diagram name ends with ".pty", it is treated as parity timing diagram. Parity timing diagrams only require a clock domain specification, they are always started with a probability of 100%. In addition, a config file may contain a hex number to be used as a starting seed. This is necessary to reproduce simulation runs. If the seed is not specified, a random seed will be used.

One advantage of using a config file using a text list of timing diagrams as testcase bucket is that the file can be easily changed. Copying or moving timing diagrams between config files is just a matter of adding/deleting/ modifying/commenting out an entry. In Timediag, a testcase bucket consists of a single file, containing all timing diagrams, which makes it hard to perform add, copy and move operations in or between testcase bucket files. TD-Control is therefore better suited for the standard testcase development cycle, where a single testcase (timing diagram) is developed and debugged, then added to a regression bucket.

While the quiesce cycle is not reached, TD-control activates timing diagrams for each clock domain in the following way:

(a) Randomly select a timing diagram in the clock domain as a starting point, (b) then for all timing diagrams in the clock domain, check if another instance of this timing diagram is allowed, and (c) when (b) allows another instance of the timing diagram, and thus the condition is satisfied as yes, then select timing diagram in <probability> percent of all cases;

(d) if a timing diagram is selected in step (c), then load that selected timing diagram executable (if not already loaded).

Then, when step (d) is complete, the process evaluates the timing diagram limitor function, and if the process evaluates the timing diagram limitor function as true, then the evaluated timing diagram is appended to the list of active timing diagrams for that clock domain.

All active instances of timing diagrams are called twice in cycles where the corresponding clock domain is active, at the beginning and at the end of the cycle. Timing diagrams returning true ran successfully. They are called again to delete the corresponding object and are removed from the list of active timing diagrams. The config file is copied into a repro file and the random seed used for the simulation run is appended. The repro file could be specified as a config file to TD-control in order to reproduce simulation runs.

Referring now to FIG. 13 it shows a statistics file generated by TD-Control about the simulation run. In addition to the information printed out by Genrand like how many times a timing diagram was activated and how often it wasn't activated due to the limitor function, timing information is included in the statistics file. It shows the minimum time a timing diagram required to run, the average time and the maximum time. This could be used to check whether the design is performing as expected.

TD-Control itself behaves like an irritator function which is called twice per cycle, so it could be integrated into existing simulation environments.

ALTERNATIVE PREFERRED EMBODIMENTS

While in accordance with the preferred embodiment of this invention, the TD-Compile currently generates code to be called by TD-Control, it is possible to change code generation, so that the resulting executable directly fits into the simulation environment (without TD-Control). In this way, the TD-compiler could be used to directly specify irritator behavior routines in a graphical way. If such a routine should be active always during a simulation run as shown in FIG. 13, the random start mechanism of TD-control is not required. Even if a behavioral routine cannot be specified completely in a graphical fashion (e.g. cell contents too complex), using TD-Compile to provide a framework, where the user just have to fill out the section which could not be described in the timing diagram editor, would be advantageous.

While the preferred embodiment, and an alternative, to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for generating executable timing diagrams for a logic design for verifying logic designs comprising, providing a user acting as a designer with a simulation drive tool set including, a program in the form of a timing diagram editor enabling a graphical input for laying out and editing a timing diagram for a logic design to be simulated after a graphical input provided by said designer describing a logic design to be verified which the designer provides in a general timing diagram format, and including a support function library, and one or more executable test cases as timing diagram test cases for use in verification of the logic design, and having a timing diagram compiler function which generates an executable timing diagram for the graphical input provided by the designer, whereupon the designer enables by describing a logic design in a general timing diagram format the creation of one or more executable irritator programs for said logic designs by generating an executable timing diagram for selected logic designs using a timing diagram compiler function for said simulation drive tool set which generates an executable timing diagram for the graphical input provided by the designer and effectively compiling the behavior of signals of said selected logic design at a designer selected given time into an executable irritator program for logic verification simulation, and wherein the steps for generating executable timing diagrams include:

(a) generating from a graphical representation of a timing diagram a header file containing an object definition for each executable timing diagram containing information about the signals to be used in said logic design and defining memory requirements for each timing diagram enabling a new instance of said object definition to be generated on activation of a timing diagram;

(b) generating a source file for each of said executable timing diagrams containing a code representation of a timing diagram; and (c) generating an executable timing diagram by compiling the source file with a compiler; and (d) translating a selected timing diagram into a function to be simulated by using a programming loop created by a call twice per simulation cycle, once to drive signals, and once to check signals, and wherein the signals are set and/or checked in each cycle according to the values specified in the timing diagram editor and each cycle is represented by a code block.

2. A method for generating executable timing diagrams for a logic design according to claim 1, wherein is provided program steps to translate a facility descriptor comprising an input/output type specifier, a signal name and a signal bit range into an array containing a pointer indicating where a signal is to be found in the logic verification simulation.

3. A method for generating executable timing diagrams for a logic design according to claim 1, wherein an entry function which is called by a controlling program by the name of the selected timing diagram provides initialization of signal pointers for generating new instances of a timing diagram object, for clocking that timing diagram object and for deleting that timing diagram object.

4. A method for generating executable timing diagrams for a logic design according to claim 1 including translating a special (recurring) cycle into a programming loop in which the drive signals are set and/or checked in each cycle according to the values specified in the timing diagram editor until the ending conditions of that programming loop or a timeout value is reached.

5. A method for generating executable timing diagrams for a logic design according to claim 1 including translating a limiting condition into a function which must evaluate to true in order to activate a timing diagram.

6. A method for generating executable timing grams for a logic design according to claim 1 including initializing an array of signal names with valid pointers to signals contained in the executable irritator program for logic verification simulation.

7. A method for generating executable timing diagrams for a logic design according to claim 1 wherein when signals whichshould be contained in the executable irritator program for logic verification simulation are not available, in order to provide the actual setting/checking of signals, the unavailable signals are assumed to be programming variables having expected values for signals for which storage space is allocated so they could be shared between timing diagrams and simulation execution is stopped in case of inequivalence between expected and actual values of signals.

8. A method for simulation of a logic design, comprising providing a control program for random selection of executable timing diagrams from a database to drive simulation of a logic design, which program, includes:
   (a) a configuration file containing a list of available timing diagrams and the associated control parameters:
   (b) a reproduction file enabling an exact reproduction of a simulation run;
   (c) a statistics file containing information about a simulation run including timing information about the duration of timing diagram activation's, and executing said control program , and wherein the program includes steps for generating executable timing diagrams, including:
      (a) generating from a graphical representation of a timing diagram a header file containing an object definition for each executable timing diagram containing information about the signals to be used in said logic design and defining memory requirements for each timing diagram enabling a new instance of said object definition to be generated on activation of a timing diagram;
      (b) generating a source file for each of said executable timing diagrams containing a code representation of a timing diagram; and
      (c) generating an executable timing diagram by compiling the source file with a compiler; and
      (d) translating a selected timing diagram into a function to be simulated by using a programming loop created by a call twice per simulation cycle, once to drive signals, and once to check signals, and wherein the signals are set and/or checked in each cycle according to the values specified in the timing diagram editor and each cycle is represented by a code block.

9. A method for simulation of a logic design a configuration file according to claim 8, wherein said configuration file comprises a list of one or more timing diagrams available for a simulation run, where associated with a name of a timing diagram, a start-up probability and clock area is specified.

10. A method for simulation of a logic design a configuration file according to claim 8, wherein for multiple clock areas for parts of the logic design running at different clock frequencies there are multiple lists of active timing diagrams, one for each clock domain.

11. A method for simulation of a logi sign a configuration file according to claim 8, wherein for a reproduction file intended to be used to reproduce simulation runs for debugging an error in an earlier simulation run, said reproduction file has the same format as a configuration file containing a list of available timing diagrams, and the reproduction file has associated with the name of the timing diagram associated random selection control parameters with a number appended which is used to control random selection during a simulation run.

12. A method for use in simulation of a logic design, comprising:
   providing a user acting as a designer with a simulation drive tool set including, a program for laying out and editing timing diagrams for a logic design to be simulated upon input provided by said designer describing a logic design, and wherein said program includes a statistics file for retaining timing information about the logic design execution of said timing diagrams, and printing a record from said statistics file after a simulation run, which record contains timing information about the execution of timing diagrams, where the minimum, average and maximum number of simulation cycles required for the execution of a timing diagram are given , and wherein the program includes steps for generating executable timing diagrams, including:
      (a) generating from a graphical representation of a timing diagram a header file containing an object definition for each executable timing diagram containing information about the signals to be used in said logic design and defining memory requirements for each timing diagram enabling a new instance of said object definition to be generated on activation of a timing diagram;
      (b) generating a source file for each of said executable timing diagrams containing a code representation of a timing diagram; and
      (c) generating an executable timing diagram by compiling the source file with a compiler; and
      (d) translating a selected timing diagram into a function to be simulated by using a programming loop created by a call twice per simulation cycle, once to drive signals, and once to check signals, and wherein the signals are set and/or checked in each cycle according to the values specified in the timing diagram editor and each cycle is represented by a code block.

13. A method for use in simulation of a logic design, comprising: providing a plurality of arbitrary irritator routines as part of a simulation program, activating one or more of said arbitrary routines which are part of a simulation program and maintaining their state of activity for use in replacement of hardware by changing an entry program so that an executable function for said arbitrary irritator routines can be called directly by the simulation program without use of a control program for generating irritator routines, and wherein the method includes steps for generating executable timing diagrams including:
   (a) generating from a graphical representation of a timing diagram a header file containing an object definition for each executable timing diagram containing information about the signals to be used in said logic design and defining memory requirements for each timing diagram enabling a new instance of said object definition to be generated on activation of a timing diagram;

(b) generating a source file for each of said executable timing diagrams containing a code representation of a timing diagram; and (c) generating an executable timing diagram by compiling the source file with a compiler; and (d) translating a selected timing diagram into a function to be simulated by using a programming loop created by a call twice per simulation cycle, once to drive signals and once to check signals, and wherein the signals are set and/or checked in each cycle according to the values specified in the timing diagram editor and each cycle is represented by a code block.

14. A method for use in simulation of a logic design, comprising using a logic verification simulation program, specifying parts in a graphical way by defining the parts in a timing diagram editor, coding other parts for simulation by the user of a simulation program and generating one or more irritator routines for logic verification simulation of those parts defined in a timing diagram editor and those coded for simulation by the simulation program user, and wherein the method includes steps for generating executable timing diagrams including:

(a) generating from a graphical representation of a timing diagram a header file containing an object definition for each executable timing diagram containing information about the signals to be used in said logic design and defining memory requirements for each timing diagram enabling a new instance of said object definition to be generated on activation of a timing diagram;

(b) generating a source file for each of said executable timing diagrams containing a code representation of a timing diagram; and (c) generating an executable timing diagram by compiling the source file with a compiler; and (d) translating a selected timing diagram into a function to be simulated by using a programming loop created by a call twice per simulation cycle, once to drive signals, and once to check signals, and wherein the signals are set and/or checked in each cycle according to the values specified in the timing diagram editor and each cycle is represented by a code block.

\* \* \* \* \*

UNITED STATES PATENT AND TRADEMARK OFFICE
CERTIFICATE OF CORRECTION

PATENT NO. : 6,453,450 B1
DATED : September 17, 2002
INVENTOR(S) : Joerg H. Walter It is certified that error appears in the above-identified patent and that said Letters Patent is hereby corrected as shown below:

Column 9,
Line 13, "A method for generating executable timing grams for a logic design" should read -- A method for generating executable timing diagrams for a logic design --

Column 10,
Line 6, "A method for simulation of a logi sign a configuration" should read -- A method for simulation of a logic design a configuration --

Signed and Sealed this

Twentieth Day of January, 2004

JON W. DUDAS
*Acting Director of the United States Patent and Trademark Office*